United States Patent
Graves et al.

(10) Patent No.: US 11,293,532 B2
(45) Date of Patent: Apr. 5, 2022

(54) SCREW JACK ASSEMBLY FOR PAVING MACHINE

(71) Applicant: Caterpillar Paving Products Inc., Brooklyn Park, MN (US)

(72) Inventors: Cameron Eitel Graves, Summerset, SD (US); John Eron Jorgensen, Andover, MN (US); Ryan Todd Thiesse, Otsego, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 258 days.

(21) Appl. No.: 16/750,117

(22) Filed: Jan. 23, 2020

(65) Prior Publication Data

US 2021/0231197 A1    Jul. 29, 2021

(51) Int. Cl.
*F16H 25/20* (2006.01)
*E01C 19/42* (2006.01)
*E01C 19/48* (2006.01)

(52) U.S. Cl.
CPC ............ *F16H 25/20* (2013.01); *E01C 19/42* (2013.01); *E01C 19/4866* (2013.01); *E01C 2301/16* (2013.01); *F16H 2025/2046* (2013.01); *F16H 2025/2062* (2013.01)

(58) Field of Classification Search
CPC .. F16H 25/20; F16H 2025/2062; F01C 19/42; F01C 19/4866; F01C 2301/2046
See application file for complete search history.

(56) References Cited

U.S. PATENT DOCUMENTS

| | | | | | |
|---|---|---|---|---|---|
| 1,282,043 | A | * | 10/1918 | Carr | ......................... E01C 19/42 |
| | | | | | 404/96 |
| 1,817,161 | A | * | 8/1931 | Mosel | ...................... E01C 19/42 |
| | | | | | 404/118 |
| 2,065,698 | A | * | 12/1936 | Heltzel | .................... E01C 19/42 |
| | | | | | 404/101 |
| 2,084,068 | A | * | 6/1937 | Vinton | .................... E01C 19/42 |
| | | | | | 404/119 |
| 3,335,646 | A | | 8/1967 | Crayton | |
| 6,203,243 | B1 | * | 3/2001 | Birtchet | .................. E01C 19/42 |
| | | | | | 404/104 |

(Continued)

FOREIGN PATENT DOCUMENTS

| | | |
|---|---|---|
| CN | 203392564 | 1/2014 |
| CN | 102608025 | 7/2014 |
| CN | 108442720 | 8/2018 |

*Primary Examiner* — David M Fenstermacher

(57) ABSTRACT

A screw jack assembly includes a first body defining a longitudinal axis and a screw drive disposed within the first body. The screw jack assembly also includes a second body movable relative to the first body and coupled to the screw drive, and a first gear coupled to the screw drive. The screw jack assembly further includes a handle assembly having a tube member coupled to the first body. The handle assembly also includes a second gear coupled to the first gear. The handle assembly further includes a handle member coupled to the second gear and adapted to rotate about a rotational axis substantially perpendicular to the longitudinal axis. The handle member is adapted to selectively rotate between an operating position and a stowed position about the longitudinal axis based, at least in part, on rotation of the tube member relative to the first body along the longitudinal axis.

20 Claims, 6 Drawing Sheets

(56) References Cited

U.S. PATENT DOCUMENTS

| | | | |
|---|---|---|---|
| 6,336,769 B1* | 1/2002 | Cincis | E01C 19/006 |
| | | | 404/118 |
| 7,320,558 B2* | 1/2008 | Quenzi | E01C 19/006 |
| | | | 404/114 |
| 8,137,026 B2* | 3/2012 | Lura | E04G 21/10 |
| | | | 404/118 |
| 8,182,173 B2 | 5/2012 | Lickel | |
| 8,827,594 B2* | 9/2014 | Pai | E04G 21/10 |
| | | | 404/118 |
| 9,028,168 B1 | 5/2015 | Knapp | |
| 10,132,047 B2* | 11/2018 | Terstriep | E01C 19/40 |
| 10,648,139 B2* | 5/2020 | Knapp | E21B 7/027 |
| 11,001,976 B2* | 5/2021 | Baratta | B25G 3/08 |
| 2014/0212217 A1* | 7/2014 | Wagner | E01C 19/42 |
| | | | 404/118 |
| 2016/0362851 A1* | 12/2016 | Oetken | E01C 7/00 |
| 2021/0231197 A1* | 7/2021 | Graves | E01C 19/48 |

* cited by examiner

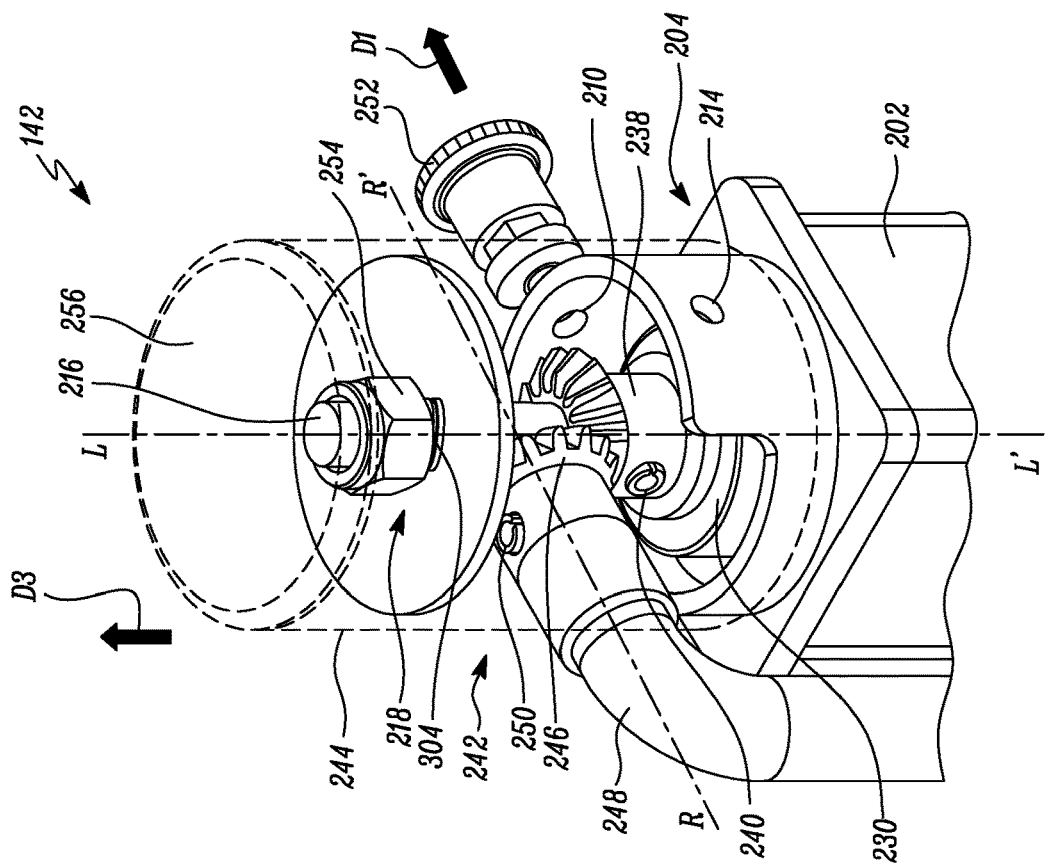
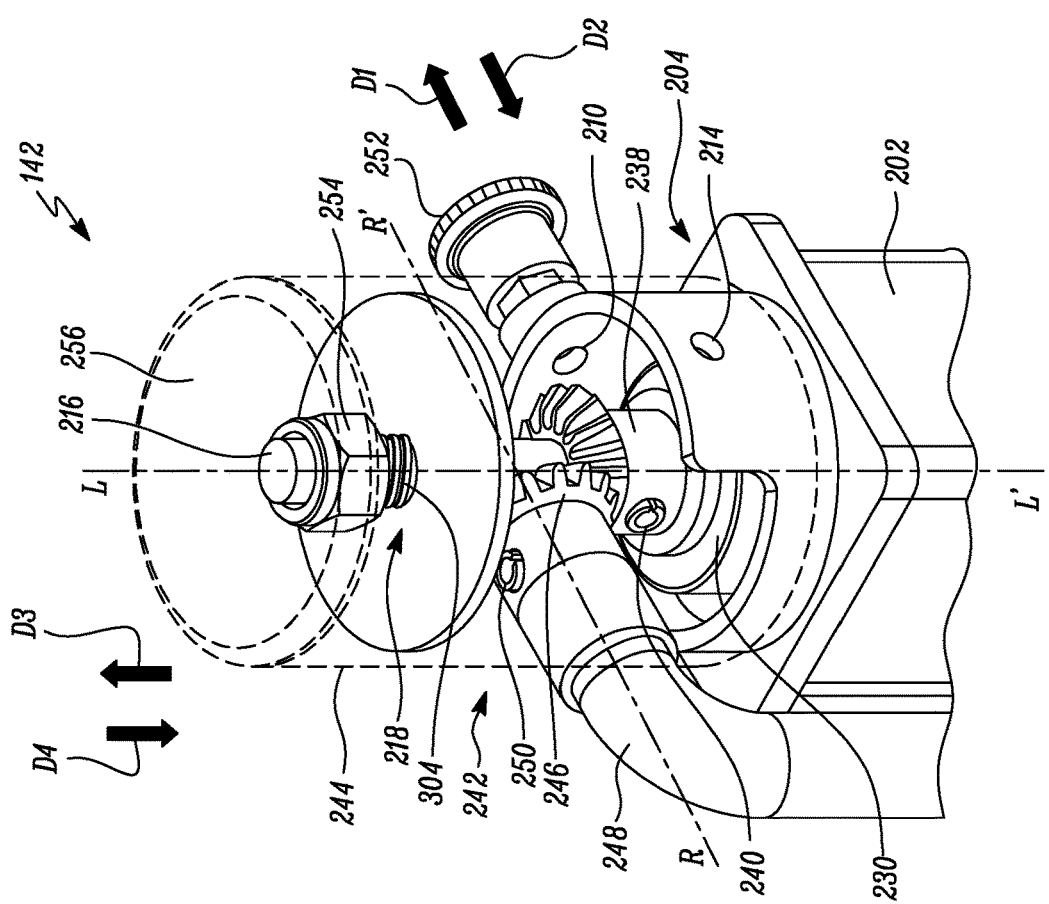
FIG. 4B
FIG. 4A

SCREW JACK ASSEMBLY FOR PAVING MACHINE

TECHNICAL FIELD

The present disclosure relates to a screw jack assembly for a paving machine. More particularly, the present disclosure relates to the screw jack assembly for a screed assembly associated with the paving machine.

BACKGROUND

A paving machine, such as an asphalt paver, includes a screed assembly for paving a layer of asphalt on a work surface. In many situations, the screed assembly may include one or more side gates disposed on opposite sides of the screed assembly. The side gates may be raised or lowered relative to the work surface using one or more screw jacks disposed on the screed assembly and coupled to the respective side gates. The screw jacks may include a rotating handle for operating the screw jack which, in some operating/stowed positions, may protrude outwardly from the screed assembly.

In such a situation, the rotating handle may increase an overall width of the paving machine. Accordingly, the increase in the overall width of the paving machine may interfere during shipping of the paving machine from one location to another, such as interfering with surrounding objects, increasing potential of damage to the screw jacks and/or surrounding objects, and so on. The rotating handle may also interfere with surrounding objects while paving, such as when paving up next to a building, with mailboxes, and the like. Also, in many situations, the increase in the overall width of the paving machine may require special shipping permits, in turn, increasing costs, increasing shipping duration, and so on. Hence, there is a need for an improved screw jack assembly for such applications.

U.S. Pat. No. 9,028,168 describes a concrete finishing machine. The finishing machine includes a mobile frame supported above a slab on front and rear wheels. The finishing machine also includes at least one screed roller and a plurality of vibrators suspended from the mobile frame between the front and rear wheels. The front and rear wheels are rotatable at least ninety degrees between a longitudinally directed traveling orientation and a laterally directed concrete finishing orientation. The front and rear wheels are driven and steerable so that the mobile frame may travel longitudinally down a lane of a road, and then upon pivoting of the wheels, move laterally over a hole in an adjacent lane having uncured concrete to be finished by the finishing machine.

SUMMARY OF THE DISCLOSURE

In an aspect of the present disclosure, a paving machine is provided. The paving machine includes a chassis and a tow arm pivotally coupled to the chassis. The paving machine also includes a screed assembly pivotally coupled to the tow arm. The screed assembly has a frame and at least one side gate movably disposed on the frame. The paving machine further includes at least one screw jack assembly operably coupled to the at least one side gate. The at least one screw jack assembly includes a first body defining a longitudinal axis and fixedly coupled to the frame. The at least one screw jack assembly includes a screw drive rotatably disposed within the first body and axially aligned along the longitudinal axis. The screw drive defines a first end and a second end. The at least one screw jack assembly includes a second body movable relative to the first body along the longitudinal axis and operably coupled to each of the screw drive and the at least one side gate. The at least one screw jack assembly also includes a first gear coupled to the first end of the screw drive. The at least one screw jack assembly further includes a handle assembly. The handle assembly includes a tube member movably coupled to the first body and axially aligned along the longitudinal axis. The handle assembly also includes a second gear disposed within the tube member and operably coupled to the first gear. The handle assembly further includes a handle member fixedly coupled to the second gear and adapted to rotate about a rotational axis substantially perpendicular to the longitudinal axis. The handle member is adapted to selectively rotate between an operating position and a stowed position about the longitudinal axis based, at least in part, on rotation of the tube member relative to the first body along the longitudinal axis.

In another aspect of the present disclosure, a screw jack assembly for a screed assembly associated with a paving machine is provided. The screw jack assembly includes a first body defining a longitudinal axis and fixedly coupled to a frame of the screed assembly. The screw jack assembly includes a screw drive rotatably disposed within the first body and axially aligned along the longitudinal axis. The screw drive defines a first end and a second end. The screw jack assembly includes a second body movable relative to the first body along the longitudinal axis and operably coupled to each of the screw drive and a side gate of the screed assembly. The screw jack assembly also includes a first gear coupled to the first end of the screw drive. The screw jack assembly further includes a handle assembly. The handle assembly includes a tube member movably coupled to the first body and axially aligned along the longitudinal axis. The handle assembly also includes a second gear disposed within the tube member and operably coupled to the first gear. The handle assembly further includes a handle member fixedly coupled to the second gear and adapted to rotate about a rotational axis substantially perpendicular to the longitudinal axis. The handle member is adapted to selectively rotate between an operating position and a stowed position about the longitudinal axis based, at least in part, on rotation of the tube member relative to the first body along the longitudinal axis.

Other features and aspects of this disclosure will be apparent from the following description and the accompanying drawings.

BRIEF DESCRIPTION OF THE DRAWINGS

FIGS. 4A, 4B, 4C, and 4D are perspective views showing different operating positions of the screw jack assembly, according to one embodiment of the present disclosure.

DETAILED DESCRIPTION

Figure 1:
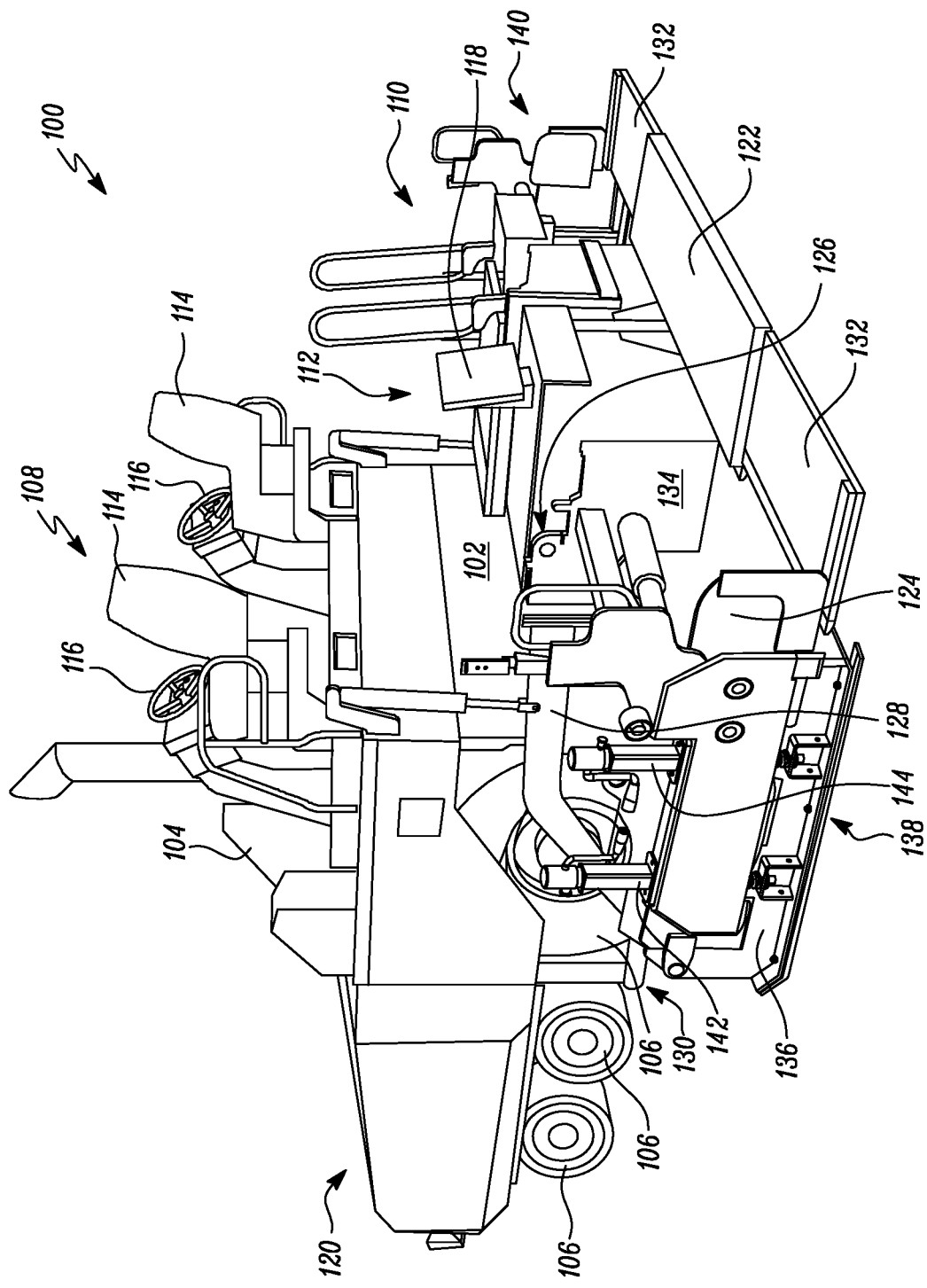
FIG. 1 is a perspective view of an exemplary paving machine, according to one embodiment of the present disclosure.

Referring to FIG. 1, an exemplary paving machine 100 is illustrated. The paving machine 100 will be hereinafter interchangeably referred to as the "machine 100". The machine 100 includes a chassis 102. The chassis 102 supports various components of the machine 100 thereon. The machine 100 includes an enclosure 104 mounted on the chassis 102. The enclosure 104 encloses a power source (not shown) therein. The power source may be any power source, such as an internal combustion engine, batteries, motor, and so on. The power source provides power to the machine 100 for operational and mobility requirements.

The machine 100 also includes a set of ground engaging members 106. The ground engaging members 106 are operably coupled to the chassis 102. In the illustrated embodiment, the ground engaging members 106 include wheels. In other embodiments, the ground engaging members 106 may include tracks. The ground engaging members 106 support and provide maneuverability to the machine 100 on a ground surface.

The machine 100 also includes a machine operator station 108 mounted on the chassis 102. The machine operator station 108 is adapted to control various functions associated with the machine 100 and, in some embodiments, functions associated with a screed assembly 110. The machine 100 also includes a screed operator station 112. The screed operator station 112 is adapted to control various functions associated with the screed assembly 110 and, in some embodiments, functions associated with the machine 100. The machine operator station 108 may include one or more seats 114 for an operator. Further, each of the machine operator station 108 and the screed operator station 112 may include respective operator interfaces 116, 118. The operator interfaces 116, 118 may be configured to receive various inputs from the operator and for displaying information to the operator during operation of the machine 100 and/or the screed assembly 110.

The machine 100 also includes a hopper assembly 120 operably coupled to the chassis 102. The hopper assembly 120 holds a volume of paving material (not shown) on the machine 100 received from an external source (not shown), such as a truck or transfer vehicle, for example. The hopper assembly 120 also transfers the paving material from one portion of the machine 100 to another. As such, the hopper assembly 120 may include one or more components (not shown), such as one or more conveyors, augers, sensors, and so on, based on application requirements.

The machine 100 also includes the screed assembly 110 mounted on the chassis 102. The screed assembly 110 includes a main screed 122 operably coupled to the chassis 102. More specifically, a frame 124 of the main screed 122 is pivotally coupled to an end 126 of a tow arm 128. Another end 130 of the tow arm 128 is pivotally coupled to the chassis 102 of the machine 100 in a manner for towing the screed assembly 110. As such, the screed assembly 110 may pivot about a pivotal connection with the chassis 102 to float freely over an asphalt surface being paved.

The screed assembly 110 also includes one or more screed extensions 132 mounted on the main screed 122. The screed extensions 132 are movably coupled to the main screed 122. Additionally, the main screed 122 may include a screed extension carriage 134 for mounting the screed extensions 132. In some embodiments, the screed extensions 132 may be mounted rearwardly of the main screed 122. In yet other embodiments, the screed extensions 132 may be mounted in front of the main screed 122, based on application requirements. Additionally, the screed assembly 110 includes at least one side gate 136 (only one side gate shown in the accompanying figure) movably disposed on the frame 124. The side gate 136 is disposed on opposing sides 138, 140 of the screed assembly 110. The side gate 136 is adapted to limit spread of the paving material from the sides 138, 140 of the screed assembly 110.

The screed assembly 110 also includes at least one screw jack assembly 142, 144. In the illustrated embodiment, the screed assembly 110 includes two screw jacks 142, 144 for each of the side gates 136. In other embodiments, the screed assembly 110 may include single or multiple screw jacks, based on application requirements. The screw jack assembly 142, 144 will now be explained with reference to the screw jack assembly 142. It should be noted that the screw jack assembly 144 has a configuration, structure, orientation, operation, dimension, and so on similar to that of the screw jack assembly 142. The screw jack assembly 142 will be hereinafter interchangeably referred to as the "screw jack 142". The screw jack 142 is operably coupled to each of the frame 124 and the side gate 136. As such, the screw jack 142 is adapted to raise or lower the side gate 136 relative to the frame 124, based on an operation of the screw jack 142.

Figure 2:
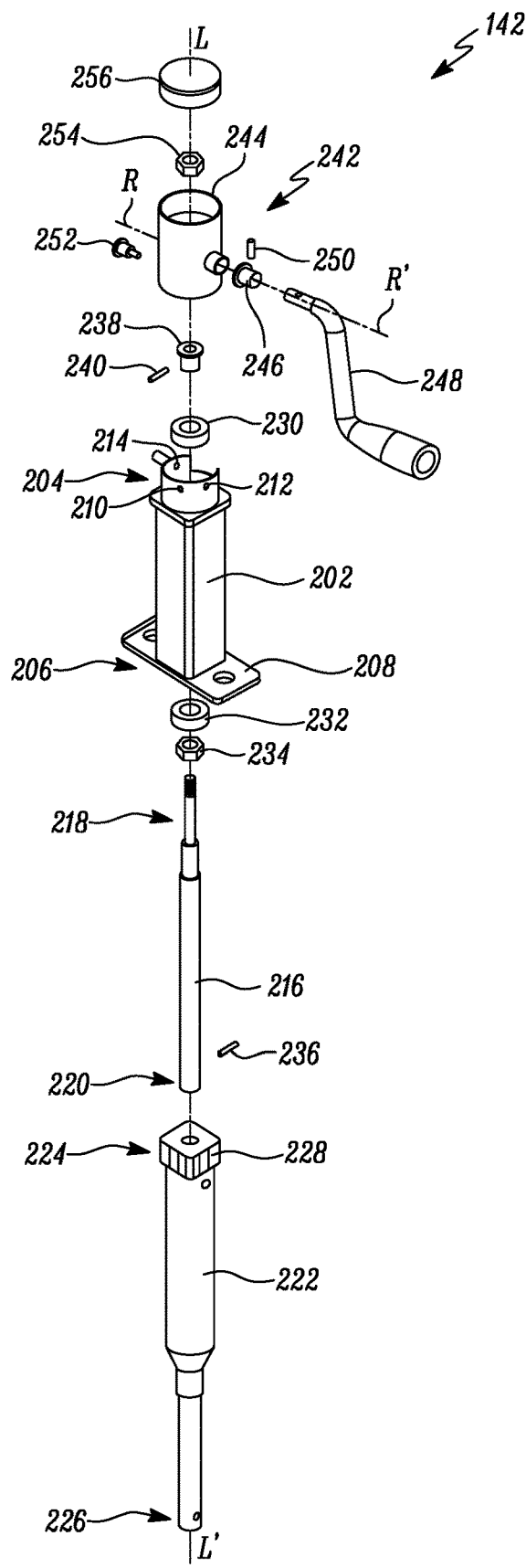
FIG. 2 is an exploded perspective view of a screw jack assembly, according to one embodiment of the present disclosure.

Referring to FIG. 2, an exploded view of the screw jack 142 is illustrated. The screw jack 142 includes a first body 202. The first body 202 has a substantially hollow and elongated configuration defining a first end 204 and a second end 206. The second end 206 is disposed opposite to the first end 204. The first body 202 also defines a longitudinal axis L-L' extending between the first end 204 and the second end 206. The first body 202 is fixedly coupled to the frame 124 using a flange portion 208 disposed on the second end 206. In other embodiments, the flange portion 208 may be disposed on any other location on the first body 202 between the first end 204 and the second end 206. The first body 202 is adapted to enclose one or more components of the screw jack 142 and will be explained in more detail later.

The first body 202 also includes at least one hole 210, 212, 214 disposed on the first end 204. More specifically, in the illustrated embodiment, the first body 202 includes a plurality of holes 210, 212, 214 disposed on the first end 204. Each of the holes 210, 212, 214 is disposed spaced apart from one another on the first end 204 of the first body 202. In the illustrated embodiment, the plurality of holes 210, 212, 214 includes three holes 210, 212, 214. In other embodiments, the first body 202 may include single or multiple holes disposed on the first end 204, based on application requirements. The holes 210, 212, 214 will be explained in more detail later.

The screw jack 142 also includes a screw drive 216. The screw drive 216 has a substantially elongated configuration and defines a first end 218 and a second end 220. The second end 220 is disposed opposite to the first end 218. The screw drive 216 is rotatably disposed within the first body 202 and axially aligned along the longitudinal axis L-L'. As such, the screw drive 216 rotates about the longitudinal axis L-L' relative to the first body 202.

The screw jack 142 also includes a second body 222. The second body 222 has a substantially elongated configuration and defines a first end 224 and a second end 226. The second end 226 is disposed opposite to the first end 224. The second body 222 is movable relative to the first body 202 along the longitudinal axis L-L' and operably coupled to each of the screw drive 216 and the at least one side gate 136. More specifically, the second body 222 includes a slide nut 228 disposed on the first end 224. The slide nut 228 is threadably coupled to the screw drive 216. Also, the slide nut 228 is slidably disposed within the first body 202 through the second end 206 of the first body 202. Further, the second end 226 of the second body 222 is coupled to the side gate 136.

Accordingly, based on rotation of the screw drive 216 about the longitudinal axis L-L', the slide nut 228 slides along the longitudinal axis L-L' within the first body 202 in order to raise or lower the side gate 136 coupled to the second end 226 of the second body 222 relative to the frame 124. Additionally, the screw jack 142 includes a number of components, such as one or more bearings 230, 232, a jam nut 234, a retention pin 236, and so on disposed within the first body 202 and/or the second body 222. The bearings 230, 232 are disposed within the first body 202 and in association with the screw drive 216. As such, the bearings 230, 232 provide rotation of the screw drive 216 along the longitudinal axis L-L' relative to the first body 202.

The jam nut 234 is disposed within the first body 202 and in association with the screw drive 216. The jam nut 234 is adapted to limit movement of the screw drive 216 along the longitudinal axis L-L'. The retention pin 236 is disposed within the second body 222 and in association with the screw drive 216. The retention pin 236 is adapted to limit extension and separation of the second body 222 relative to the screw drive 216 along the longitudinal axis L-L' through the second end 206 of the first body 202. It should be noted that the screw jack 142 may include additional components (not shown), such as washers, bushes, additional bearings, fasteners, interconnecting surfaces, engaging surfaces, stepped surfaces, collars, lubrication grooves, limit stops, and so on, based on application requirements.

The screw jack 142 also includes a first gear 238. In the illustrated example, the first gear 238 is fixedly coupled to the first end 218 of the screw drive 216 using a retention pin 240. Alternatively, the first gear 238 may be coupled to the first end 218 of the screw drive 216 by other means, such as a key, a set screw, splines, and the like. Accordingly, the first gear 238 is adapted to rotate about the longitudinal axis L-L' with the screw drive 216. In the illustrated embodiment, the first gear 238 is a straight type bevel gear. In other embodiments, the first gear 238 may be any other type of bevel gear, such as a helical type bevel gear. The screw jack 142 also includes a handle assembly 242 disposed in association with the first body 202. The handle assembly 242 includes a tube member 244. The tube member 244 is movably coupled to the first end 204 of the first body 202 and axially aligned along the longitudinal axis L-L'. In some embodiments, the first gear 238 may include any other gear mechanism adapted to provide 0 degrees (°) to 90° or 360° of rotation of the tube member 244 relative to the first body 202, based on application requirements.

The handle assembly 242 also includes a second gear 246. The second gear 246 is disposed within the tube member 244 and operably coupled to the first gear 238. The second gear 246 is adapted to rotate about a rotational axis R-R', such that the rotational axis R-R' is disposed substantially perpendicular to the longitudinal axis L-L'. In the illustrated embodiment, the second gear 246 is a straight type bevel gear. In other embodiments, the second gear 246 may be any other type of bevel gear, such as a helical type bevel gear. In some embodiments, the second gear 246 may include any other gear mechanism adapted to provide 0 degrees (°) to 90° or 360° of rotation of the tube member 244 relative to the first body 202, based on application requirements. The handle assembly 242 also includes a handle member 248. The handle member 248 is rotatably disposed through the tube member 244. Also, in the illustrated example, the handle member 248 is fixedly coupled to the second gear 246 using a retention pin 250. Alternatively, the handle member 248 may be coupled to the second gear 246 by other means, such as a key, a set screw, splines, and the like. Accordingly, the handle member 248 is adapted to rotate about the rotational axis R-R' with the second gear 246.

The handle assembly 242 also includes a plunger 252. The plunger 252 is disposed in association with each of the tube member 244 and the first body 202. The plunger 252 is adapted to selectively engage and disengage with the first body 202. More specifically, the plunger 252 is adapted to selectively engage and disengage with one of the holes 210, 212, 214 disposed on the first end 204 of the first body 202. The handle assembly 242 also includes a fastener 254, such as a nut. The fastener 254 is removably coupled to each of the tube member 244 and the first end 218 of the screw drive 216. As such, the fastener 254 is adapted to retain the handle assembly 242 on the first body 202. Additionally, the handle assembly 242 includes a cap member 256. The cap member 256 is removably disposed on the tube member 244, such as by thread coupling. The cap member 256 is adapted to enclose components of the handle assembly 242 within the tube member 244.

Figure 3B:
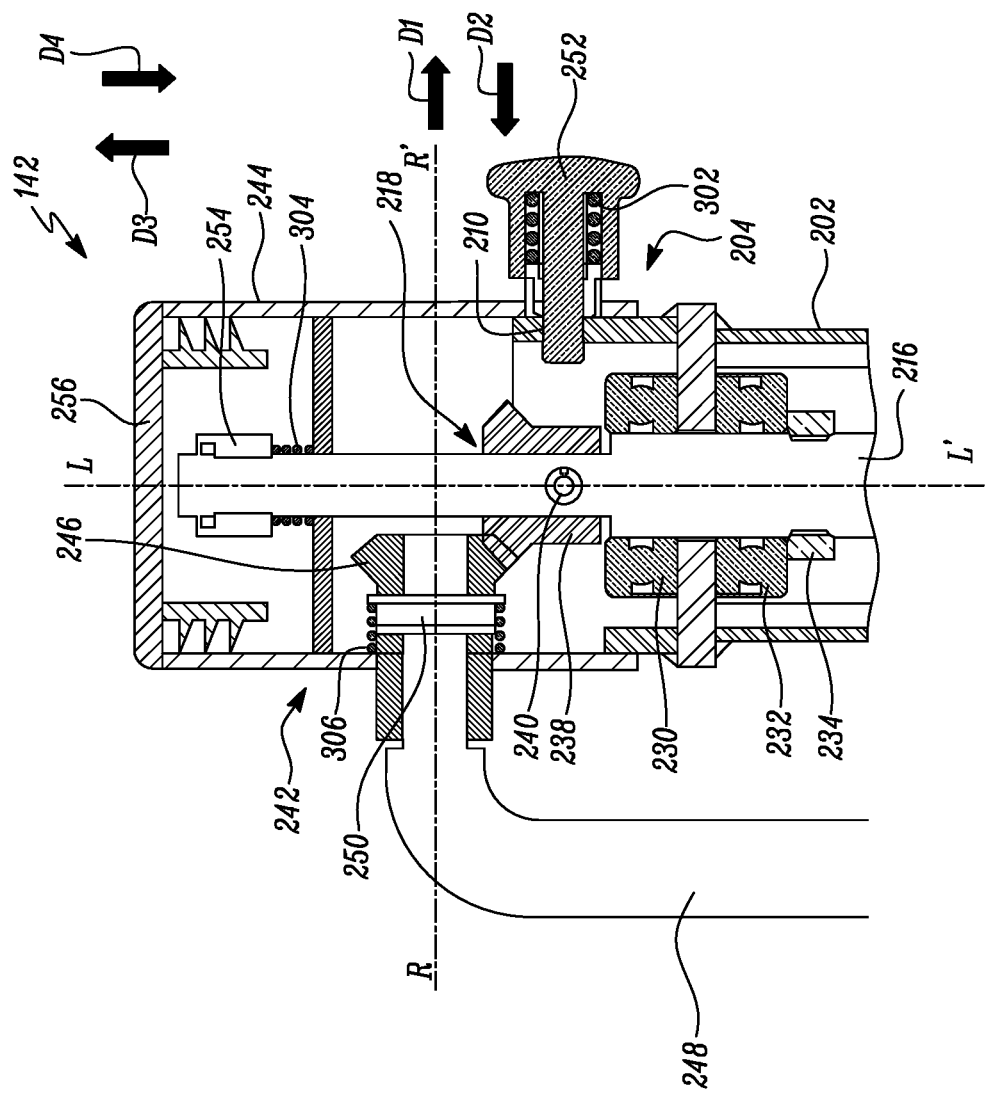
FIGS. 3A and 3B are different views showing an operating position of the screw jack assembly, according to one embodiment of the present disclosure.
Figure 3A:
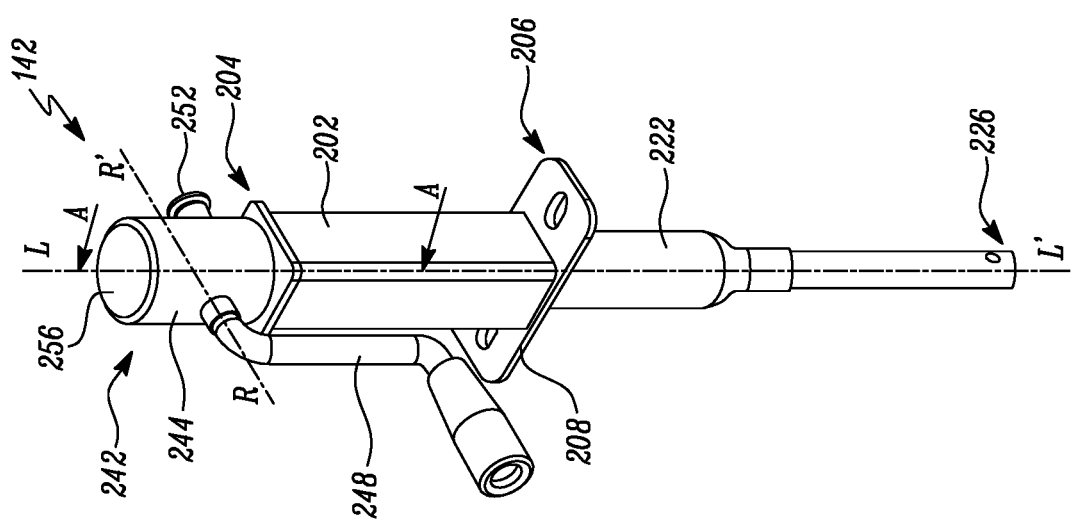

Referring to FIG. 3A, a perspective view of the screw jack 142 in an assembled position and an operating position is illustrated. Referring to FIG. 3B, a cross sectional view of the screw jack 142 along a section A-A (shown in FIG. 3A) is illustrated. In some embodiments, the handle assembly 242 may optionally include a first resilient member 302. The first resilient member 302 is disposed in association with the plunger 252 and the tube member 244. In the illustrated embodiment, the first resilient member 302 is a spring element. In other embodiments, the first resilient member 302 may be any other resilient element, such as a resilient washer, and so on. The first resilient member 302 is adapted to bias the plunger 252 in engagement with the first body 202.

More specifically, in a disengaged position of the plunger 252, the plunger 252 is moved in a direction "D1", such that the plunger 252 may compress the first resilient member 302 and disengage from the respective hole 210. Further, when the plunger 252 is aligned with the respective hole 210, the first resilient member 302 may expand and bias the plunger 252 in a direction "D2" in engagement with the respective hole 210. As such, in an engaged position of the plunger 252 (as shown in the accompanying figure), rotation of the tube member 244 and the handle member 248 about the longitudinal axis L-L' is limited.

Additionally, the handle assembly 242 is adapted to selectively move away from the first body 202 along the longitudinal axis L-L' to disengage the second gear 246 relative to the first gear 238. More specifically, in some embodiments, the handle assembly 242 may optionally include a second resilient member 304. The second resilient member 304 is disposed in association with the tube member 244 and the fastener 254. In the illustrated embodiment, the second resilient member 304 is a spring element. In other embodiments, the second resilient member 304 may be any other resilient element, such as a resilient washer, and so on. The second resilient member 304 is adapted to bias the second gear 246 in engagement with the first gear 238.

More specifically, in a disengaged position of the tube member 244, the tube member 244 and the handle member 248 are moved in a direction "D3", such that the tube member 244 may compress the second resilient member 304 and disengage the second gear 246 relative to the first gear 238. Further, when the tube member 244 is released, the second resilient member 304 may expand and bias the tube member 244 and the handle member 248 in a direction "D4", such that the second gear 246 may engage with the first gear 238. As such, in an engaged position of the tube member 244 (as shown in the accompanying figure), based on rotation of the handle member 248 and the second gear 246 about the rotational axis R-R', the first gear 238 and the screw drive 216 rotate about the longitudinal axis L-L', in turn, moving the second body 222 and the side gate 136 about the longitudinal axis L-L'.

In some embodiments, the handle member 248 is adapted to selectively move away from the tube member 244 along the rotational axis R-R' to disengage the second gear 246 relative to the first gear 238. More specifically, in some embodiments, the handle assembly 242 may optionally include a third resilient member 306. The third resilient member 306 is disposed in association with the tube member 244 and the handle member 248. In the illustrated embodiment, the third resilient member 306 is a spring element. In other embodiments, the third resilient member 306 may be any other resilient element, such as a resilient washer, and so on. The third resilient member 306 is adapted to bias the second gear 246 in engagement with the first gear 238.

More specifically, in a disengaged position of the handle member 248, the handle member 248 is moved in the direction "D2", such that the handle member 248 may compress the third resilient member 306 and disengage the second gear 246 relative to the first gear 238. Further, when the handle member 248 is released, the third resilient member 306 may expand and bias the handle member 248 in the direction "D1", such that the second gear 246 may engage with the first gear 238. As such, in an engaged position of the handle member 248 (as shown in the accompanying figure), based on rotation of the handle member 248 and the second gear 246 about the rotational axis R-R', the first gear 238 and the screw drive 216 rotate about the longitudinal axis L-L', in turn, moving the second body 222 and the side gate 136 about the longitudinal axis L-L'.

INDUSTRIAL APPLICABILITY

Figure 4D:
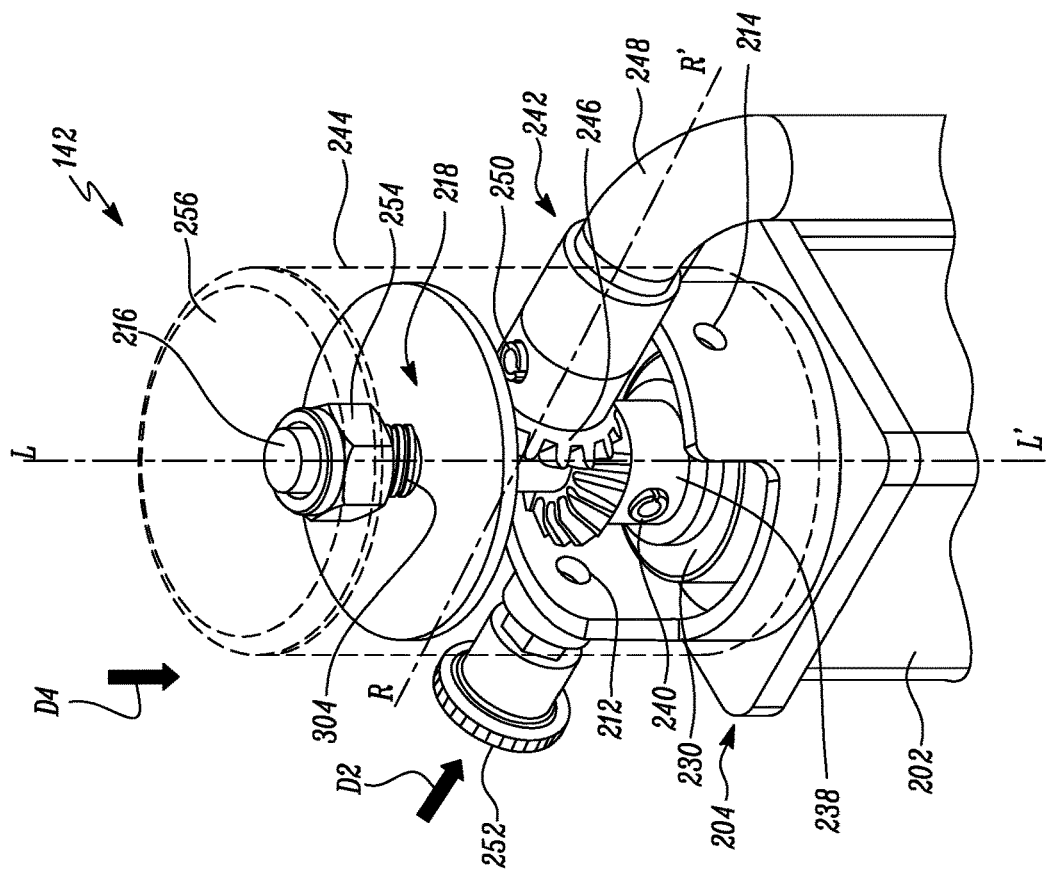

The present disclosure relates to the handle assembly 242 for the screw jack 142. The operation of the screw jack 142 will now be explained with reference to FIGS. 4A to 4D. Referring to FIG. 4A, the screw jack 142 is shown in the operating position. In the operating position, the plunger 252 is disposed in the engaged position with the hole 210. Also, the tube member 244 and the handle member 248 is disposed in the engaged position, such that the second gear 246 is engaged with the first gear 238. As such, based on rotation of the handle member 248 about the rotational axis R-R', the first gear 238 and the screw drive 216 rotate about the longitudinal axis L-L', in turn, moving the second body 222 and the side gate 136 along the longitudinal axis L-L'.

Referring to FIG. 4B, the plunger 252 is moved in the direction "D1" in the disengaged position relative to the hole 210 and the tube member 244. In a situation when the plunger 252 may include the first resilient member 302, the first resilient member 302 may be compressed in the disengaged position of the plunger 252. Also, the tube member 244 is moved in the direction "D3" in the disengaged position. As such, the second gear 246 is disengaged relative to the first gear 238. In a situation when the tube member 244 may include the second resilient member 304, the second resilient member 304 may be compressed in the disengaged position of the tube member 244.

Figure 4C:
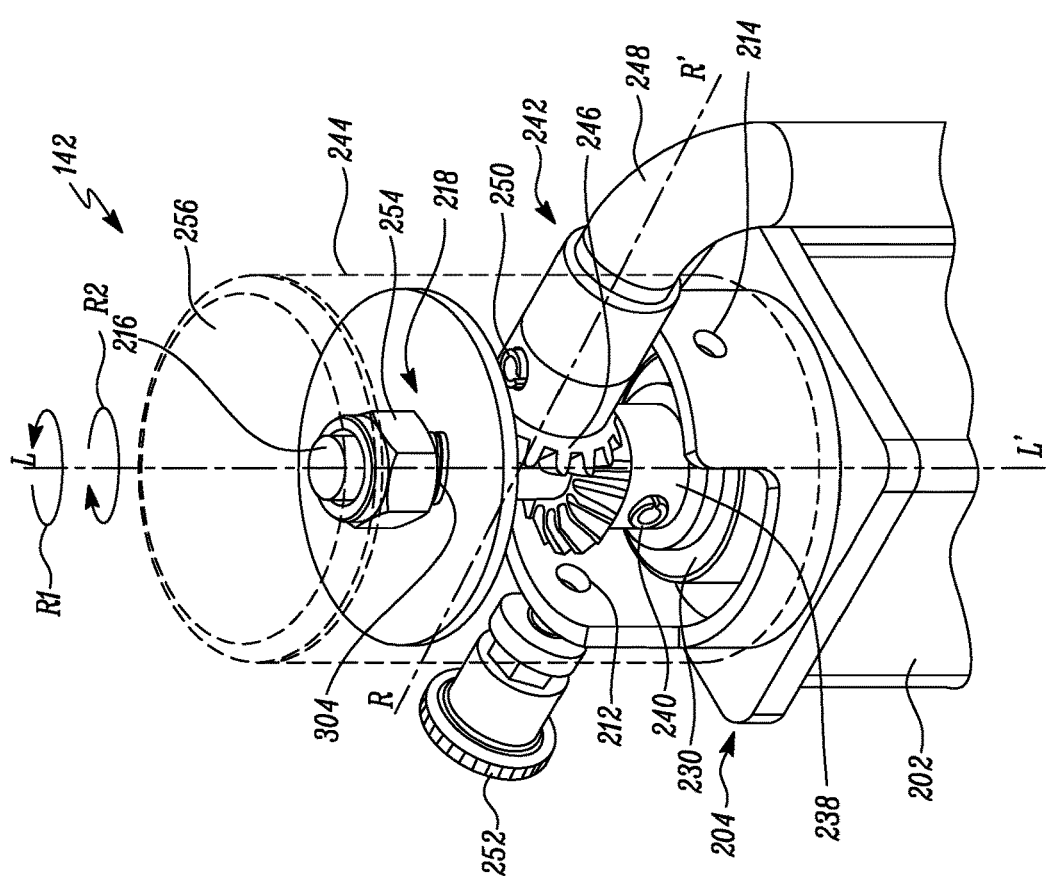

Referring to FIG. 4C, the tube member 244 is rotated about the longitudinal axis L-L' in a direction "R1". It should be noted that, alternatively, the tube member 244 may also be rotated about the longitudinal axis L-L' in a direction "R2", based on application requirements. As such, the handle assembly 242 is adapted to selectively rotate up to 360 degrees (°) about the longitudinal axis L-L'. Referring to FIG. 4D, as the plunger 252 may be aligned with the hole 212, the plunger 252 may be moved in the direction "D2", such that the plunger 252 may engage with the hole 212. In the situation when the plunger 252 may include the first resilient member 302, the first resilient member 302 may expand to move the plunger 252 in the engaged position. In a situation when the first resilient member 302 may be omitted, the plunger 252 may be moved in the engaged position by the operator.

Also, the tube member 244 may be moved in the direction "D4", such that the second gear 246 may engage with the first gear 238. In the situation when the tube member 244 may include the second resilient member 304, the second resilient member 304 may expand to move the tube member 244 in the engaged position. In a situation when the second resilient member 304 may be omitted, the tube member 244 may be moved in the engaged position by the operator. As such, the screw jack 142 may be disposed in a stowed position. Accordingly, the handle member 248 is adapted to selectively rotate between the operating position and the stowed position about the longitudinal axis L-L' based on rotation of the tube member 244 relative to the first body 202 along the longitudinal axis L-L'.

Figure 5B:
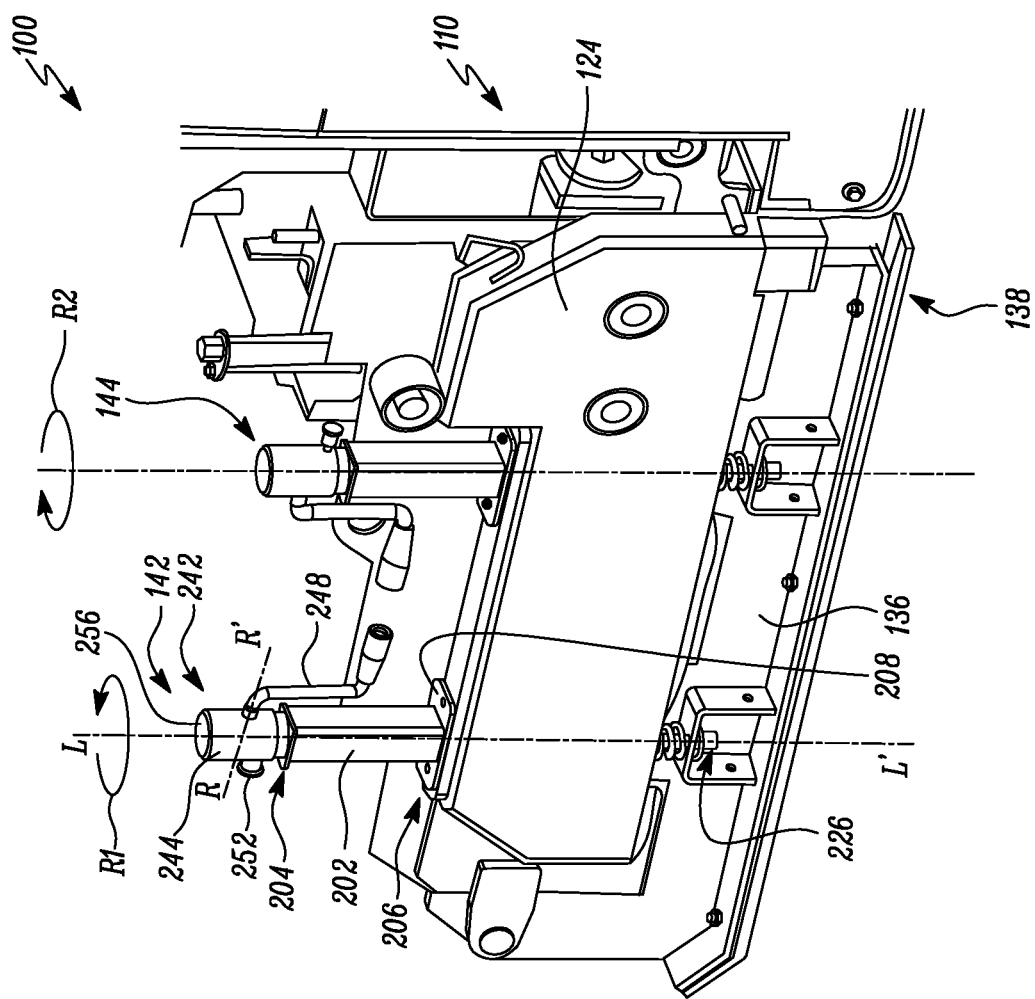
FIGS. 5A and 5B are different perspective views showing a stowed position of the screw jack assembly, according to one embodiment of the present disclosure.
Figure 5A:
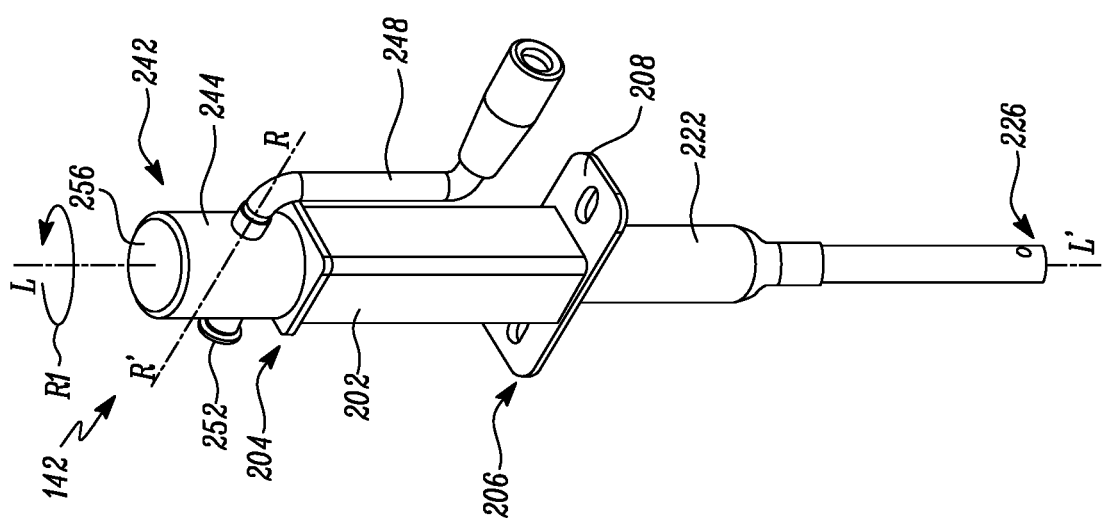

Referring to FIGS. 5A and 5B, the screw jack 142 is shown in the stowed position. It should be noted that the stowed position of the screw jack 142 described and shown in the accompanying figures is merely exemplary and may vary, based on application requirements. For example, when the handle assembly 242 may be rotated in the direction "R2" and the plunger 252 may be engaged in the hole 214, the screw jack 142 may be disposed in another stowed position as shown in FIG. 5B with reference to another screw jack 144. It should also be noted that the operating position of the screw jack 142 described and shown in the accompanying figures is merely exemplary and may vary, based on application requirements. It should further be noted that the screw jack 142 may be disposed in one or more intermediate operating positions (not shown) between the operating position and the stowed positions, based on additional holes (not shown) provided between each of the holes 210, 212, 214 on the first end 204 of the first body 202.

The screw jack 142 may be moved between the operating position and the stowed positions in multiple ways. In some embodiments, the screw jack 142 may be moved between the operating position and the stowed position without moving the tube member 244 in the disengaged position. In such a situation, the second gear 246 may be continuously engaged with the first gear 238. Accordingly, as the tube member 244 may be rotated in any of the direction "R1" or the direction "R2" based on disengagement of the plunger 252 relative to the hole 210, the second gear 246 and the handle member 248 may rotate about the rotational axis R-R'. Further, in the stowed position of the screw jack 142, the plunger 252 may be engaged with any of the holes 212, 214 and the handle member 248 may be rotated about the rotational axis R-R' in any desired position as may be required.

In yet some embodiments, based on movement of the handle member 248 along the rotational axis R-R', the screw jack 142 may be moved between the operating position and the stowed position without moving the tube member 244 in the disengaged position. More specifically, the handle member 248 may be moved in the direction "D2" in order to compress the third resilient member 306 and disengage the second gear 246 relative to the first gear 238. The tube member 244 may then be rotated in any of the direction "R1" or the direction "R2" in the stowed position based on disengagement of the plunger 252 relative to the hole 210. In the stowed position of the screw jack 142, the plunger 252 may be engaged with any of the holes 212, 214 and the third resilient member 306 may expand in order to bias the handle member 248 in the direction "D1" and engage the second gear 246 relative to the first gear 238. In some situations when the third resilient member 306 may be omitted, the handle member 248 may be moved in the direction "D1" by the operator.

The screw jack 142 provides a simple, efficient, and cost-effective method to raise and lower the side gate 136 relative to the frame 124, based on application requirements. The screw jack 142 includes the handle member 248 adapted to be disposed in any of the operating position and the stowed positions based on rotation of the tube member 244. As such, during operation of the side gate 136, the screw jack 142 may be disposed in the operating position in order to enable operation of the handle member 248 by the operator. Further, during shipping of the machine 100, the screw jack 142 may be disposed in the stowed position in order to limit protrusion of the handle member 248 beyond a maximum width or an allowable shipping width of the machine 100, in turn, limiting damage to the screw jack 142 or surrounding objects/personnel during shipping, reducing need of special and expensive shipping permits, reducing shipping duration, and so on. Further, the screw jack 142 may be disposed in the stowed position when the machine 100 is paving up against obstacles, such as a building.

Additionally, the screw jack 142 may be operated in multiple ways, such as with or without movement of the tube member 244 in the directions "D3", "D4", with or without movement of the handle member 248 in the directions "D2", "D1", and so on, in turn, improving flexibility, improving usability, improving operability, and so on. The handle assembly 242 includes simple, readily available components, such as the tube member 244, the second gear 246, the handle member 248, the plunger 252, the cap member 256, the first resilient member 302, the second resilient member 304, the third resilient member 306, and so on, in turn, reducing complexity and costs. The handle assembly 242 may be retrofitted on any screw jack with little or no modification to existing system, in turn, improving flexibility and compatibility.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A paving machine comprising:
   a chassis;
   a tow arm pivotally coupled to the chassis;
   a screed assembly pivotally coupled to the tow arm, the screed assembly having a frame and at least one side gate movably disposed on the frame; and
   at least one screw jack assembly operably coupled to the at least one side gate, the at least one screw jack assembly including:
      a first body defining a longitudinal axis and fixedly coupled to the frame;
      a screw drive rotatably disposed within the first body and axially aligned along the longitudinal axis, the screw drive defining a first end and a second end;
      a second body movable relative to the first body along the longitudinal axis and operably coupled to each of the screw drive and the at least one side gate;
      a first gear coupled to the first end of the screw drive; and
      a handle assembly including:
         a tube member movably coupled to the first body and axially aligned along the longitudinal axis;
         a second gear disposed within the tube member and operably coupled to the first gear; and
         a handle member fixedly coupled to the second gear and adapted to rotate about a rotational axis substantially perpendicular to the longitudinal axis, wherein the handle member is adapted to selectively rotate between an operating position and a stowed position about the longitudinal axis based, at least in part, on rotation of the tube member relative to the first body along the longitudinal axis.

2. The paving machine of claim 1, wherein the handle assembly further includes a plunger disposed in association with each of the tube member and the first body, the plunger adapted to selectively engage and disengage with the first body.

3. The paving machine of claim 2, wherein the handle assembly further includes a resilient member disposed in association with the plunger, the resilient member adapted to bias the plunger in engagement with the first body.

4. The paving machine of claim 2, wherein the first body includes at least one hole adapted to engage with the plunger.

5. The paving machine of claim 4, wherein the at least one hole includes a plurality of holes, each of the plurality of holes disposed spaced apart from another on the first body.

6. The paving machine of claim 1, wherein the handle assembly is adapted to selectively move away from the first body along the longitudinal axis to disengage the second gear relative to the first gear.

7. The paving machine of claim 6, wherein the handle assembly further includes a resilient member disposed in association with the tube member, the resilient member adapted to bias the second gear in engagement with the first gear.

8. The paving machine of claim 1, wherein the handle member is adapted to selectively move away from the tube member along the rotational axis to disengage the second gear relative to the first gear.

9. The paving machine of claim 8, wherein the handle assembly further includes a resilient member disposed in association with the handle member, the resilient member adapted to bias the second gear in engagement with the first gear.

10. The paving machine of claim 1, wherein the handle assembly is adapted to selectively rotate up to 360 degrees about the longitudinal axis.

11. The paving machine of claim 1, wherein each of the first gear and the second gear is a bevel type gear.

12. A screw jack assembly for a screed assembly associated with a paving machine, the screw jack assembly comprising:
   a first body defining a longitudinal axis and fixedly coupled to a frame of the screed assembly;

a screw drive rotatably disposed within the first body and axially aligned along the longitudinal axis, the screw drive defining a first end and a second end;

a second body movable relative to the first body along the longitudinal axis and operably coupled to each of the screw drive and a side gate of the screed assembly;

a first gear coupled to the first end of the screw drive; and a handle assembly including:

a tube member movably coupled to the first body and axially aligned along the longitudinal axis;

a second gear disposed within the tube member and operably coupled to the first gear; and a handle member fixedly coupled to the second gear and adapted to rotate about a rotational axis substantially perpendicular to the longitudinal axis, wherein the handle member is adapted to selectively rotate between an operating position and a stowed position about the longitudinal axis based, at least in part, on rotation of the tube member relative to the first body along the longitudinal axis.

13. The screw jack assembly of claim 12, wherein the handle assembly further includes a plunger disposed in association with each of the tube member and the first body, the plunger adapted to selectively engage and disengage with the first body.

14. The screw jack assembly of claim 13, wherein the handle assembly further includes a resilient member disposed in association with the plunger, the resilient member adapted to bias the plunger in engagement with the first body.

15. The screw jack assembly of claim 12, wherein the first body includes at least one hole adapted to engage with the plunger.

16. The screw jack assembly of claim 12, wherein the handle assembly is adapted to selectively move away from the first body along the longitudinal axis to disengage the second gear relative to the first gear.

17. The screw jack assembly of claim 16, wherein the handle assembly further includes a resilient member disposed in association with the tube member, the resilient member adapted to bias the second gear in engagement with the first gear.

18. The screw jack assembly of claim 12, wherein the handle member is adapted to selectively move away from the tube member along the rotational axis to disengage the second gear relative to the first gear.

19. The screw jack assembly of claim 18, wherein the handle assembly further includes a resilient member disposed in association with the handle member, the resilient member adapted to bias the second gear in engagement with the first gear.

20. The screw jack assembly of claim 12, wherein each of the first gear and the second gear is a bevel type gear.

\* \* \* \* \*